May 24, 1960
S. G. BRADY
2,937,732
LINEAR INDEXING MECHANISM
Filed Aug. 27, 1956
2 Sheets-Sheet 1
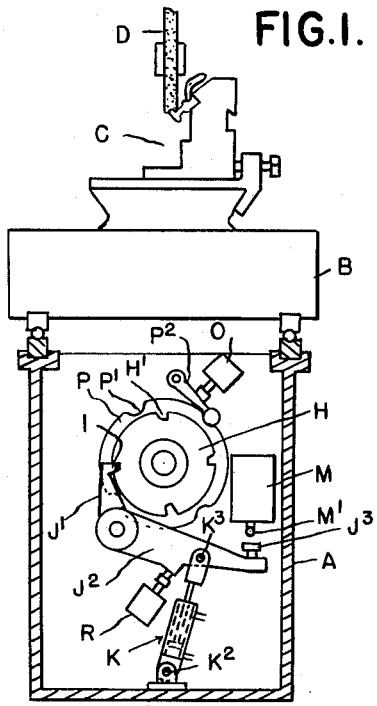
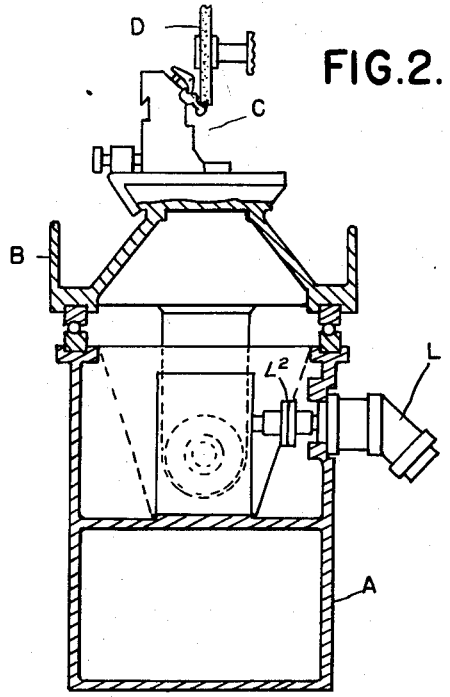
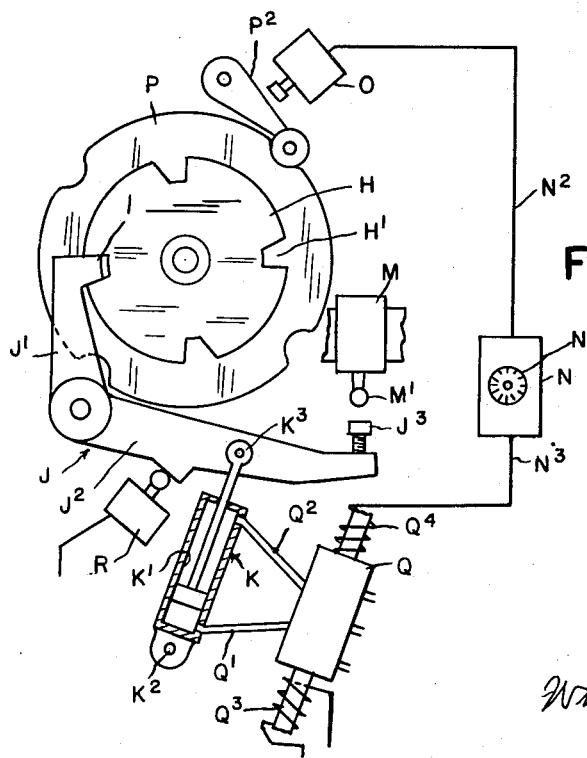
INVENTOR.
SAMUEL G. BRADY
BY
Whittemore Hulbert+Belknap.
ATTORNEYS May 24, 1960  S. G. BRADY  2,937,732
LINEAR INDEXING MECHANISM
Filed Aug. 27, 1956  2 Sheets-Sheet 2

INVENTOR.
SAMUEL G. BRADY
BY
*Whittemore Hulbert & Belknap*
ATTORNEYS

United States Patent Office 2,937,732
Patented May 24, 1960

2,937,732

LINEAR INDEXING MECHANISM

Samuel G. Brady, Bloomfield Township, Oakland County, Mich., assignor, by mesne assignments, to Ex-Cell-O Corporation, Detroit, Mich., a corporation of Michigan Filed Aug. 27, 1956, Ser. No. 606,315

10 Claims. (Cl. 192—139)

The invention relates to linear indexing mechanism such as used in connection with certain machine tools.

It is one of the objects of the invention to obtain a simple construction which is easily adjustable to change the unit spacing of the series, and to this end, the invention consists in the construction as hereinafter set forth.

In the accompanying drawings:

Fig. 1 is a cross section on line 1—1, Fig. 3, of a griding machine to which my improved linear indexing mechanism is applied.

Fig. 2 is a cross section on line 2—2, Fig. 3, from the opposite end.

Fig. 4 is a diagram.

Figure 3:
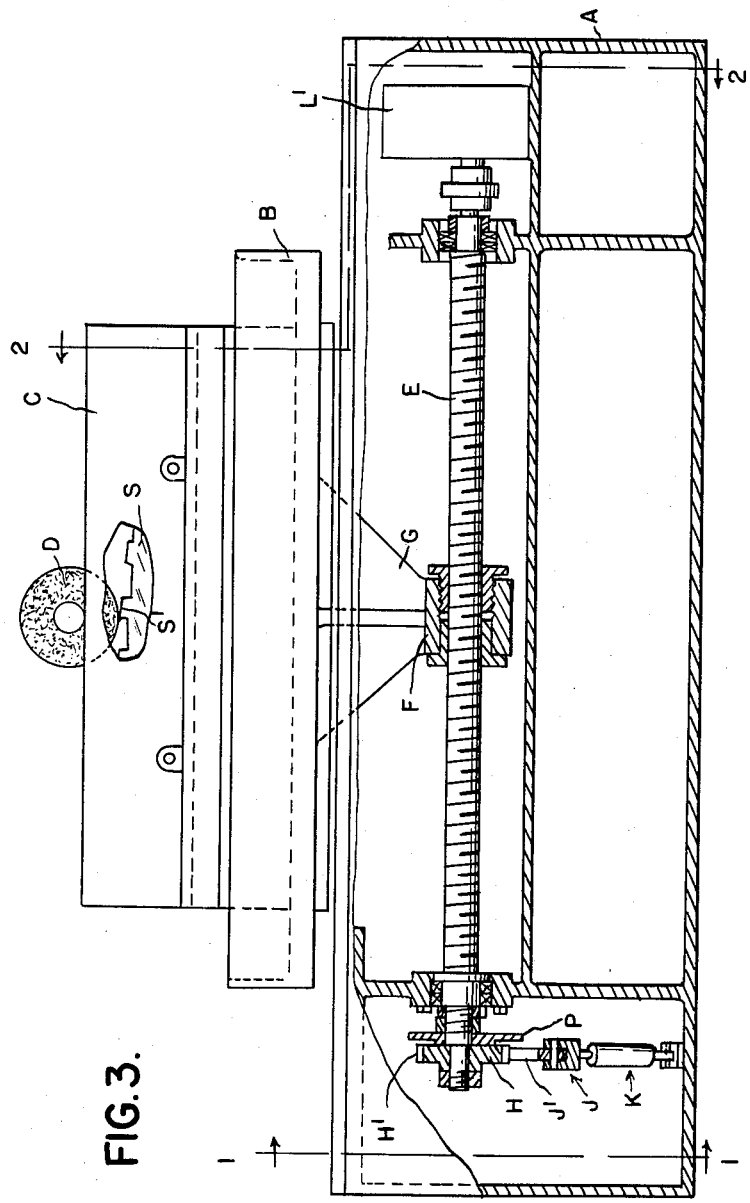
Fig. 3 is a side elevation partly in section.

As specifically illustrated, the indexing mechanism is applied to a grinding machine for fashioning and sharpening broaches but it is obvious that it may be used for any type of work where linear indexing is required. A is a frame of a machine having mounted thereon a carriage B for a work holder C which is to be advanced through a series of index points for successive registration with a grinder wheel D or other operating tool. Upon the frame A and extending longitudinally thereof is a screw E engaged by a nut F in an arm G depending from the carriage. At one end of the screw, to the left in Fig. 3, is a rotary index plate H having a plurality of peripheral gashes H′ for alternative engagement with a locking pin I. As specifically shown in Figs. 1 and 4, this plate has four equi-spaced gashes H′ adapted to lock the screw from rotation each quarter of a revolution, this constituting the unit or minimum spacing between successive index positions. If greater spacing is required, any multiple of this unit may be used, as will be later described. The lock pin I is mounted on one arm J′ of a rock lever J having an actuating arm J². The pin is preferably a tapered lug engaging tapered gashes H′ for exact positioning. K is a fluid actuated motor for intermittently operating the lever J having a cylinder K′ pivotally anchored at K² and a piston member pivotally connected at K³ to the arm J². The length of stroke of the piston within the cylinder is greater than necessary for withdrawal of the pin I from its engagement with a gash H′, the extra movement being used for operating a control mechanism.

As specifically shown, the rotating mechanism for the screw is a hydraulic motor L controlled by a valve M in the fluid supply connection to said motor. This valve is operated by a plunger M′ which in turn is actuated by the arm J² of the lever J. An adjustable screw J³ may be so set that after the pin I is withdrawn from engagement with the gash H′, it will contact with the plunger M′ and operate the valve to start the motor L. As hydraulic motors operate best at a fairly high speed of rotation and as the screw E must be rotated at slow speed, a stepdown transmission L′ is interposed between the motor L and a shaft coupling member L² to the screw E. Thus, when the motor K is operated to actuate the lever J in a direction to withdraw the lock pin I, it will also actuate the valve M, starting the rotation of the hydraulic motor L and the screw E, which will continue until the motor K is actuated in the reverse direction to re-engage the lock pin with one of the gashes H′.

It is one of the objects of the invention to provide means for quickly changing the spacing between index points. This I have accomplished by the use of a counter mechanism which may be set to effect the re-engagement of lock pin I after a predetermined number of the gashes H′ have passed the same. The specific construction of this counter mechanism is not my invention but one construction of the type is manufactured by the Eagle Signal Corporation of Moline, Illinois, and sold under the trade name of Microflex Counter. This is electromechanical and responds to a succession of in-put electrical impulses to effect an out-put electrical impulse after a predetermined count. As indicated diagrammatically at Fig. 4, the counter N has a rotary dial N′ which may be set for the desired count. $N^2$ is the conductor for the in-put electrical impulses and $N^3$ for the out-put. The in-put impulses are from a limit switch O which is actuated by a rotary cam P on the screw E adjacent to the index plate H. The cam has actuating depressions P′ equal in number to the gashes H′ but set angularly somewhat in advance thereof. $P^2$ is a rock arm successively actuated by the depressions P′ to operate the switch O so that an electrical impulse is passed through the conductor $N^2$ for each depression. The electrical impulse, through the conductor $N^3$, actuates the motor K in a direction to re-engage the lock pin I with a gash H′. This is accomplished through a valve member Q which controls the motor K and has passages Q′ and $Q^2$ leading to opposite ends of the cylinder O on opposite sides of the piston therein. A solenoid $Q^3$ moves the valve in position to admit pressure fluid through the passage Q′ and exhaust fluid through the passage $Q^2$. The solenoid $Q^4$ moves the valve to admit pressure fluid through the passage $Q^2$ and exhaust fluid through the passage Q′. The latter position will hold the lock pin I′ in engagement with a gash H′. Thus, in an indexing operation, the solenoid $Q^3$ is energized to actuate the motor K and lever J in a direction to first withdraw the lock pin I and then to operate the valve M so as to start the motor L and rotate the screw E. This rotation continues while the cam P successively operates the limit switch O sending successive electrical impulses through the conductor $N^2$ to the counter N and after the count at which said counter is set sending an electrical impulse through the conductor $N^3$ to the solenoid $Q^4$. This will reverse the valve Q operating the motor K in a direction to stop the hydraulic motor L and re-engage the lock pin I with a gash H′. In brief, the extent of rotation of the screw E between starting and stopping of the motor L is determined by the setting of the counter N and is always a multiple of the angular movement of said screw between adjacent gashes of the index plate H. The solenoid $Q^3$ may be energized by the closing of a circuit therethrough either manually or automatically after the completion of work of the grinder in one index position to advance the carriage B to the next index position.

A limit switch R is positioned to be operated by the lever J at the completion of its movement for locking the index plate. This switch may either operate a signal or may start the grinding operation.

The linear indexing mechanism above described may thus be easily adjusted to change the distance between successive index points and without the use of complex mechanism. All that is required for such change is to turn the dial N′ of the counter N to the desired setting. The work mounted in the holder C may be anything requiring linear indexing but, as specifically shown, is a broach S having successive teeth S'. The grinding and fashioning of these teeth is effected by suitable movements of the grinder wheel D in each index position of the work which is accomplished by mechanism not shown.

What I claim as my invention is:

1. A linear indexing mechanism comprising a rotary screw extending the full length of a series of index points, a nut engaging said screw, a carriage actuated by said nut for advancement along said series of index points, a rotary index plate coupled to said screw and having gashes spaced to correspond to the minimum spacing of said index points, a lock pin movable into or out of engagement with a registering gash in said index plate, means for rotating said screw when said lock pin is disengaged, means operating upon the disengagement of said pin for starting said rotating means, counter mechanism operative to count the successive registration of said gashes with said lock pin, and means operated by said counter mechanism after a selected number of counts to stop said rotating means and reengage said lock pin.

2. The construction as in claim 1 in which said index plate is mounted on said screw at one end thereof.

3. The construction as in claim 2 in which said screw rotating means is a hydraulic motor coupled to the opposite end of the screw.

4. The construction as in claim 1 in which said counter is of a type responsive to successive in-put electrical impulses to produce after a predetermined count an out-put electrical impulse, the latter effecting said stopping of said rotating means and re-engagement of said lock pin.

5. The construction as in claim 4 in which said counter is externally adjustable for a selected count.

6. The construction as in claim 4 including a rock lever having a tapered lug on one arm thereof forming said lock pin which is engageable with tapering gashes in said index plate for exact positioning of the latter, said lever having another arm controlling said rotation starting and stopping means.

7. The construction as in claim 6 in which said arms are relatively positioned to provide slight lost motion of the lever between their respective points of engagement or disengagement with their coacting members.

8. The construction as in claim 7 having adjustment means on said lever for the amount of lost motion between the stopping of said rotating means and the initial engagement of said lock pin with a gash in said index plate.

9. The construction as in claim 8 having a valve control reciprocating fluid motor for operating said rock lever in opposite directions, said output electrical impulse of the counter-controlling movement of said motor in the direction for stopping rotation and reengaging the lock pin.

10. A linear indexing mechanism comprising a rotary screw extending the full length of a series of index points, a nut engaging said screw, a carriage actuated by said nut for advancement along said series of index points, an index plate coupled to said screw for rotation therewith, said plate having radially extending gashes spaced circumferentially therearound located to pass between indexed positions thereof on rotation of said screw to move said carriage a distance corresponding to the minimum spacing of said index points, a pivotally mounted rock lever associated with said index plate, a tapered lock pin on one end of said rock lever movable into or out of engagement with a registering gash in said index plate on rocking of said rock lever, means for rotating said screw when said lock pin is disengaged, said rock lever being operable to actuate said means for rotating said screw on rocking of said rock lever to disengage said lock pin, a cam attached to said screw for rotation therewith having depressions spaced around the circumference thereof corresponding to the gashes in said index plate and spaced angularly with respect thereto, a rock arm pivotally mounted adjacent said cam, a switch positioned adjacent to said rock arm, a counter having an electrical input connection from said switch, said rock arm being operable on rotation of a cam depression into registration therewith to complete a circuit to send an electrical signal to said counter, means for rocking said rock lever, and means actuated by said counter on the reception thereby of a predetermined number of electrical signals to actuate said means for rocking said rock lever.

References Cited in the file of this patent

UNITED STATES PATENTS

| | | |
|---|---|---|
| 1,455,795 | Logan | May 22, 1923 |
| 2,628,539 | De Neergaard | Feb. 17, 1953 |
| 2,672,067 | Hansell | Mar. 16, 1954 |
| 2,705,466 | Sargrove et al. | Apr. 5, 1955 |
| 2,710,934 | Senn | June 14, 1955 |
| 2,853,169 | Usselmann | Sept. 23, 1955 |